United States Patent [19]

Margerum et al.

[11] Patent Number: 4,875,890
[45] Date of Patent: Oct. 24, 1989

[54] FEED PLATE ASSEMBLY FOR AXIAL FLOW COMBINE

[75] Inventors: Edwin O. Margerum, Paradise, Pa.; Russell W. Strong, Brugge, Belgium

[73] Assignee: Ford New Holland, Inc., New Holland, Pa.

[21] Appl. No.: 161,525

[22] Filed: Feb. 29, 1988

[51] Int. Cl.⁴ .............................................. A01F 7/06
[52] U.S. Cl. ................................... 460/68; 460/66; 56/14.6; 198/612
[58] Field of Search ......... 56/14.6; 130/27 T, 27 AB, 130/27 Z, 27 R; 198/612

[56] References Cited

U.S. PATENT DOCUMENTS

| | | | |
|---|---|---|---|
| 3,994,303 | 11/1976 | Rowland-Hill | 130/27 T |
| 4,087,953 | 5/1978 | Wilson et al. | 56/14.6 |
| 4,209,024 | 6/1980 | Powell et al. | 56/14.6 |
| 4,291,709 | 9/1981 | Weber et al. | 130/27 T |
| 4,328,815 | 5/1982 | Rowland-Hill | 130/27 T |
| 4,665,929 | 5/1987 | Helm | 130/27 T |

Primary Examiner—John Weiss
Attorney, Agent, or Firm—Larry W. Miller; Frank A. Seemar; Darrell F. Marquette

[57] ABSTRACT

An axial flow combine harvester feed plate assembly for directing crop material from an elevator into a longitudinally extending threshing and separating rotor is disclosed wherein the feed plate assembly includes a surface extending upwardly and rearwardly to a junction with an arcuate surface to direct the mat of crop material being conveyed by the elevator in a linear path into a spirally extending flow path around the threshing and separating rotor. For axial flow harvesters having a pair of threshing and separating rotors, the feed plate includes a central divider member and a pair of transversely spaced side members providing an infeed configuration that eliminates dead spots in the transition of the flow of crop material from the elevator to the threshing and separating rotors to provide a smooth and efficient harvesting operation.

7 Claims, 6 Drawing Sheets

FEED PLATE ASSEMBLY FOR AXIAL FLOW COMBINE

BACKGROUND OF THE INVENTION

The present invention relates generally to axial flow combine harvesters and, more particularly, to a feed plate configuration for directing crop material conveyed by the feederhouse in a linear path into a spiral path around the threshing and separating rotors.

Crop material is fed tangentially into the threshing cylinder of a conventional combine. Tangential feed is an easy and uncomplicated method of conveying crop material compared to the conveying of crop material longitudinally into the end of an axial flow threshing and separating rotor. The feeding of a mat of crop material along a linear path by the feederhouse elevator and the subsequent dividing of the mat for feeding into a pair of transversly spaced threshing and separating rotors is particularly difficult.

The feederhouse elevator typically comprises a chain and slat conveyor operable within a hollow feederhouse structure to convey crop material collected by the attached combine header rearwardly into the threshing and separator mechanism. The feederhouse elevator in axial flow combines conveys the mat of crop material along a linear path to the infeed portion of one or more threshing and separating rotors. Each rotor includes an auger section operable to engage the mat of crop material delivered from the feederhouse elevator and convey it rearwardly into the threshing and separating sections of the rotor.

For an axial flow threshing and separating rotor to work properly, the amount of crop material must be conveyed along a spiral path around the circumference of the rotor to be subjected to a threshing action between the raspbars and the concave. Accordingly, the infeed geometry between the feederhouse elevator and the threshing and separating rotor, operable in conjunction with the auger thereof, is critical. Since the mat of crop material conveyed by the feederhouse elevator tends to hold inherently together, the separating of the amount of crop material into the two distinct spiral paths is even more difficult and highly dependent upon the infeed geometry of the rotor housing.

One type of infeed geometry specifically developed for axial flow combines having two transversely spaced threshing and separating rotors can be found in U.S. Pat. No. 4,291,709, granted on Sept. 29, 1981 to Steven J. Weber and E. W. Rowland-Hill. While this particular infeed geometry has been commercially successful, the guide plates provide dead spots where crop material can accumulate without entering the rotor chamber until a sufficient amount of crop material has been collected. When this happens, a slug of accumulated crop material enters the rotor chamber and may cause a noisy, inefficient operation when trying to thresh and separate the grain therefrom. Furthermore, the guide plates of this prior art infeed geometry do little to positively urge the crop material into a spiral path before entering the rotor chamber.

SUMMARY OF THE INVENTION

It is an object of this invention to overcome the aforementioned disadvantages of the prior art by providing an improved feed plate configuation cooperable with the auger section of a threshing and separating rotor to efficiently convey crop material into a spiral path around the rotor.

It is another object of this invention to eliminate dead spots in the infeed configuration of an axial flow combine harvester so that the crop material will continuously flow into the threshing and separating rotors.

It is a feature of this invention that the crop material cannot accumulate in the infeed area to enter the rotor chamber as a slug.

It is still another object of this invention to provide an infeed geometry to urge the crop material from a linear path of travel induced by the feeder house elevator to a spiral flow path circumferentially around the threshing and separating rotor.

It is an advantage of this invention that the feeding of a mat of crop material to an axial flow threshing and separating rotor is smoothly and efficiently accomplished.

It is another feature of this invention that the feed plate assembly for directing the flow of the crop material between the feeder house elevator and a pair of axial flow threshing and separating rotors includes a centrally positioned divider member and a pair of transversely spaced side members.

It is another advantage of this invention that the upwardly and rearwardly sloping surfaces of the feed plate members cooperate with the auger section of the threshing and separating rotors to positively direct the flow of crop material into a spiral path.

It is yet another object of this invention to provide a transition surface on the side feed plate members to provide a clearance relief between the auger section of the threshing and separating rotor and the arcuate surface against which it cooperates.

It is a further object of this invention to provide a feed plate assembly for an axial flow combine harvester to define the infeed geometry thereof between the feeder house elevator and the threshing and separating rotors which is durable in construction, inexpensive of manufacture, carefree of maintenance, facile in assemblage, and simple and effective in use.

These and other objects, features and advantages are accomplished according to the instant invention by providing an axial flow combine harvester feed plate assembly for directing crop material from an elevator into a longitudially extending threshing and separating rotor wherein the feed plate assembly includes a surface extending upwardly and rearwardly to a junction with an arcuate surface to direct the mat of crop material being conveyed by the elevator in a linear path into a spirally extending flow path around the threshing and separating rotor. For axial flow harvesters having a pair of threshing and separating rotors, the feed plate includes a central divider member and a pair of transversely spaced side members providing an infeed configuration that eliminates dead spots in the transition of the flow of crop material from the elevator to the threshing and separating rotors to provide a smooth and efficient harvesting operation.

BRIEF DESCRIPTION OF THE DRAWINGS

The advantages of this invention will become apparant upon consideration of the following detailed disclosure of the invention, especially when taken in conjunction with the accompanying drawings wherein.

DETAILED DESCRIPTION OF THE PREFERRED EMBODIMENT

Figure 1:
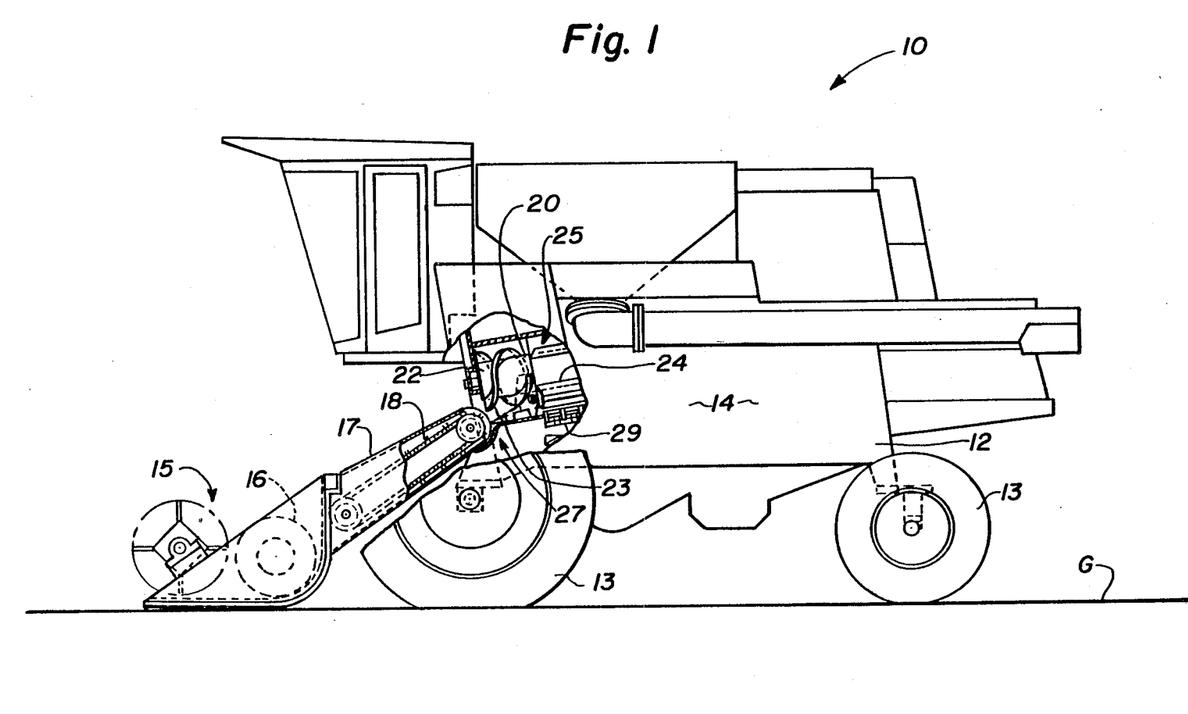
FIG. 1 is a side elevational view of an axial flow combine harvester incorporating the principals of the instant invention, a portion of the side sheet, tire and feeder house being broken away to better show the relationship between the threshing and separating rotor, the feed plate, and the feeder house elevator.

Referring now to the drawings and, particularly, to FIG. 1, a side elevational view of a crop harvesting machine, commonly referred to as a combine, can be seen. Any left and right references are used as a matter of convenience and are determined by standing at the rear of the machine, facing the forward end, looking in the direction of travel. The combine harvester 10 is provided with a frame 12 on which are mounted wheels 13 to mobilely support the combine 10 over the ground G. A crop harvesting header 15 is disposed forwardly of the combine 10 to gather crop material from the ground G, consolidate the collected crop material with an auger 16 into a feeder house 17, and convey the consolidated crop material rearwardly into the combine 10 by an elevator 18 housed within the hollow feeder house 17.

The harvesting operation on the collected crop material is accomplished by at least one longitudinally extending threshing and separating rotor 20 supported on the frame 12 the combine 10 immediately rearwardly of the elevator 18 so as to receive crop material therefrom. The threshing and separating rotor 20 is provided with an auger section 22 positioned proximate to the elevator 18 and a threshing and separating section 24 immediately rearwardly of the auger section 22. The auger section 22 is provided with an auger flighting 23 cooperable with the infeed area 27 forming a part of the rotor chamber 25 surrounding the threshing and separating rotor 20. In operation, the auger flighting 23 engages crop material delivered rearwardly by the elevator 18 and conveys it rearwardly to the threshing and separating section 24 for harvesting treatment of the crop material to separate the grain crop from the trash material. With axial flow combine harvesters as shown in FIG. 1, it is necessary to change the flow path of the crop material from a linear path induced by the elevator 18 into a spiral path around the circumference of the threshing and separating rotor 20 so that the crop material is conveyed rearwardly along the rotor 20 while being threshed between the threshing and separating section 24 and the concave 29 in a known manner.

Figure 2:
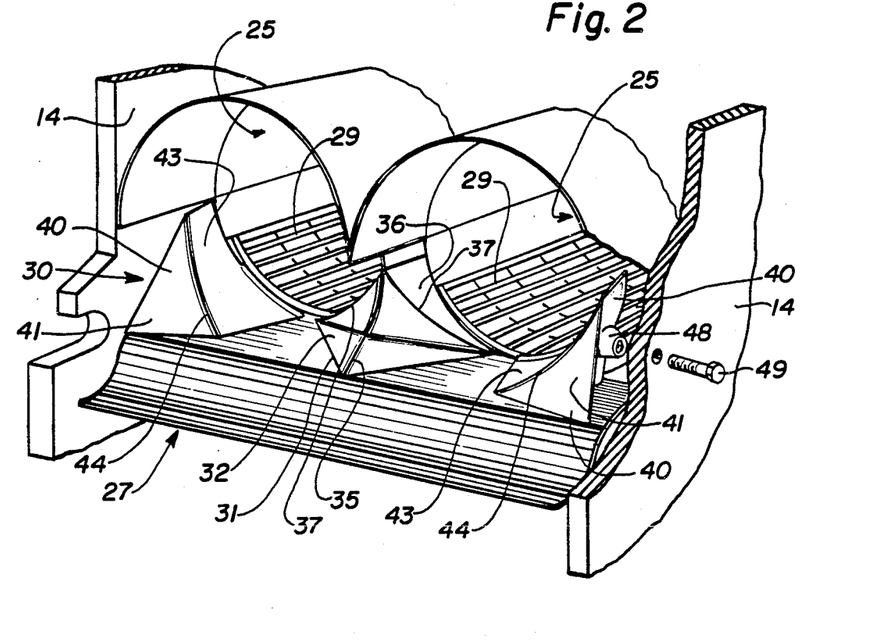
FIG. 2 is a perspective view of the infeed area of the combine to which the feeder house would be mounted, the threshing and separating rotors being removed for purposes of clarity.
Figure 3:
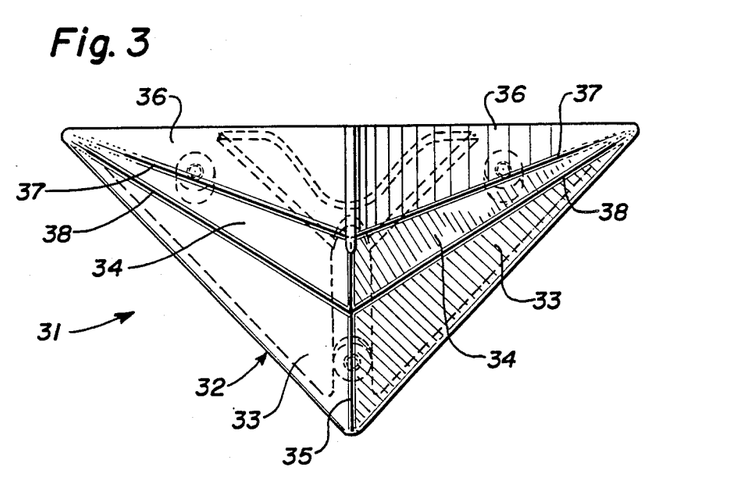
FIG. 3 is a top plan view of the divider member forming a part of the feed plate assembly.
Figure 4:
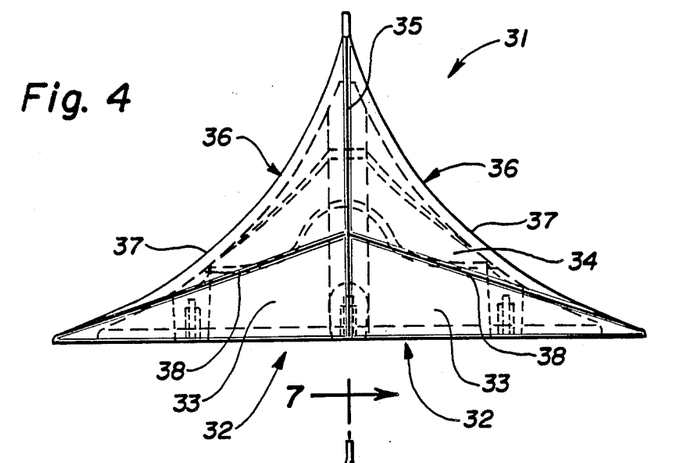
FIG. 4 is a front elevational view of the divider member seen in FIG. 3.
Figure 5:
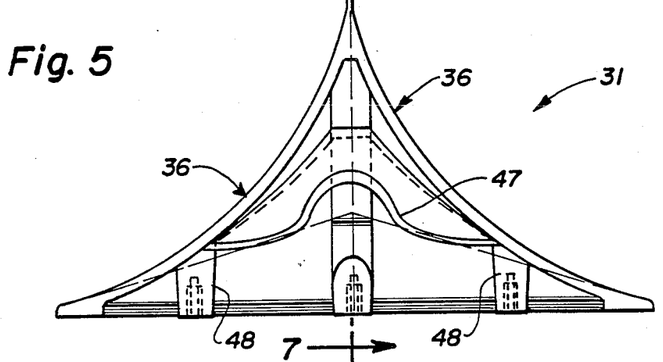
FIG. 5 is a rear elevational view of the divider member seen in FIG. 3.
Figure 6:
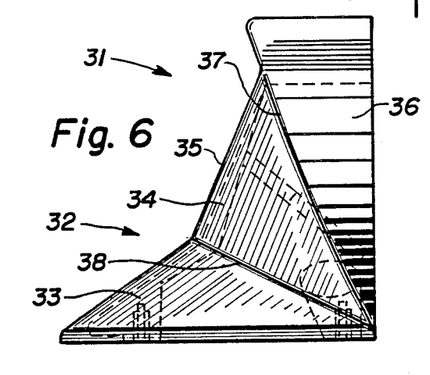
FIG. 6 is a side elevational view of the divider member seen in FIGS. 3–5.
Figure 7:
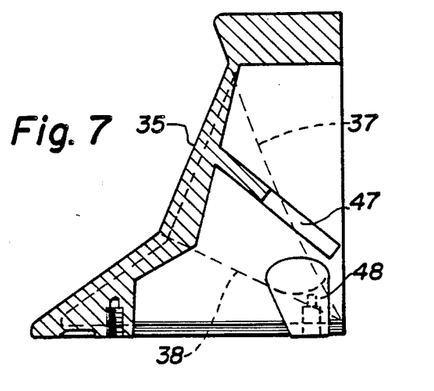
FIG. 7 is a cross-sectional view of the divider member taken along lines 7—7 of FIG. 5.
Figures 8, 9, 10, 11:
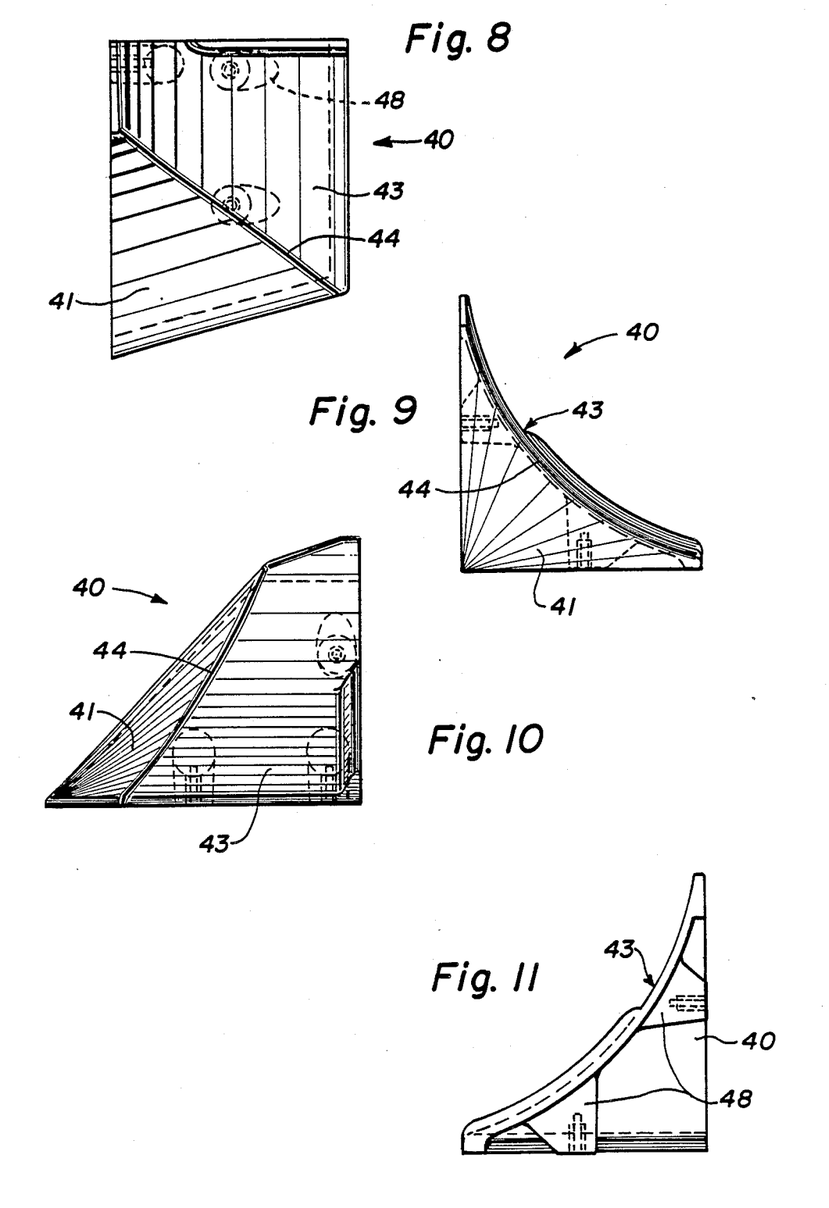
FIG. 8 is a top plan view of the right side member forming a part of the feed plate assembly.
FIG. 9 is a front elevational view of the side member seen in FIG. 8.
FIG. 10 is a side elevational view of the side member seen in FIG. 8.
FIG. 11 is a rear elevational view of the side member seen in FIGS. 8–10.

As best seen in FIG. 2, the infeed area 27 of the rotor chamber 25 is provided with a feed plate assembly 30 to assist the flow of crop material from the elevator 18 and the feeder house 17 into a path around the threshing and separating rotor 20. In the type of combine 10 depicted in FIGS. 1 and 2, the combine 10 is provided with a pair of transversely spaced threshing and separating rotors 20, each having its own rotor chamber 25 cooperable with a common infeed area 27 so that the mat of crop material being conveyed rearwardly by the elevator 18 must be divided into two flows for individual treatment by the separate rotors 20. The feed plate assembly 30 is in the form of a divider member 31 disposed centrally between the two threshing and separating rotors 20 and a pair of oppositely disposed side members 40 positioned on the left and right sides of the infeed area 27 on the opposing sides of the respective rotors 20 from the divider member 31. The purpose of the divider member 31 is to assist the division of the crop material into two separate flow paths, as well as to facilitate the change of the flow path from a linear one induced by the elevator 18 to a spiral path circumferentially around the rotors 20.

The divider member 31 is provided with an upwardly and rearwardly extending first surface 32 being disposed in two separate portions, a forward portion 33 and a rearwardly portion 34. As can be seen in FIGS. 2–7, the rearward portion 34 of the first surface 32 has a greater vertical slope than the forward portion 33. The rearward portion 34 of the first upwardly and rearwardly extending surface 32 joins a first arcuate surface 36 corresponding to each respective rotor 20 and being generally concentric with the axis of rotation thereof. The first surface 32 is divided by a generally vertically extending dividing line 35 symmetrically dividing the divider member 31 into two halves corresponding to the transversely spaced threshing and separating rotors 20.

The jointure of the rearward portion 34 with the first arcuate surface 36 forms a first jointure line 37 extending on opposing directions from the dividing line 35 rearwardly and inwardly toward the corresponding rotor 20. Similarly, the jointure between the forward portion 33 and the rearward portion 34 of the first surface 32 forms a third jointure line 38 that also extends rearwardly and inwardly toward the corresponding rotor 20 from the dividing line 35. On each side of the dividing line 35 the first and third jointure lines 37, 38 converge as they extend away from the dividing line 35. This specific structure helps guide and direct the flow of crop material from the dividing line 35 into a spiral path around the corresponding threshing and separating rotor 20. The dividing member 31 is provided with a number of mounting members 48 tapped and threaded to receive a bolt, thereby permitting engagement with the frame 12 of the combine 10 to affix the divider member 31 into position between the rotors 20. The divider member 31 is also provided with a support gusset 47 to strengthen the structural integrity of the divider member 31.

Referring now to FIGS. 2 and 8–11, the structural details of the side members 40 can best be seen. The left and right side members 40 are formed as mirror images of one another; hence, the description of the right side member as depicted in FIGS. 8–11 will suffice for both side members 40. The side member 40 is also provided with an upwardly and rearwardly extending surface 41 extending from adjacent the feeder house elevator 18 to jointure with the arcuate surface 43 which is adjacent the threshing and separating rotor 20 and which is generally concentric about the axis of rotation thereof. The jointure between the surface 41 and the arcuate surface 43 forms a second jointure line 44 extending upwardly and rearwardly toward the outside circumference of the corresponding rotor 20. The side member 40 is also provided with mounting members 48 engageable with bolts, such as exemplified by bolt 49 in FIG. 2, to permit a mounting of the side members 40 to the frame 12 of the combine harvester 10. Referring to FIGS. 2–11, the disposition of the jointure lines 37, 38 and 44 assist in guiding the crop material in a spiral path around the corresponding threshing and separating rotor 20 away from the dividing line 35 of the divider member 31.

Referring now to FIGS. 12–16, an alternative embodiment of the side member 40 can best be seen. This alternative embodiment is provided with a transition surface 46 disposed between the surface 41 and the arcuate surface 43 to provide some relief to the tight clearance between the arcuate surface 43 and the auger section 22 of the threshing and separating rotor 20. The transition surface 46 is also an arcuate surface that displaces some of the arcuate surface 43 shown in FIGS. 8–11; however, the radius of curvature thereof is greater than the radius of curvature of the arcuate surface 43, thereby providing a clearance relief with respect to the auger section 22. Although this transition surface 46, due to the differences in the radius of curvature with respect to the arcuate surface 43, forms a ledger surface 45 facing the inflow of crop material delivered by the elevator 18. The ledger surface 45 does not, however, impede the flow of crop material because of the spiral path to be induced thereto around the circumference of the threshing and separating rotor 20 which is generally parallel to the ledger surface 45.

Figure 12:
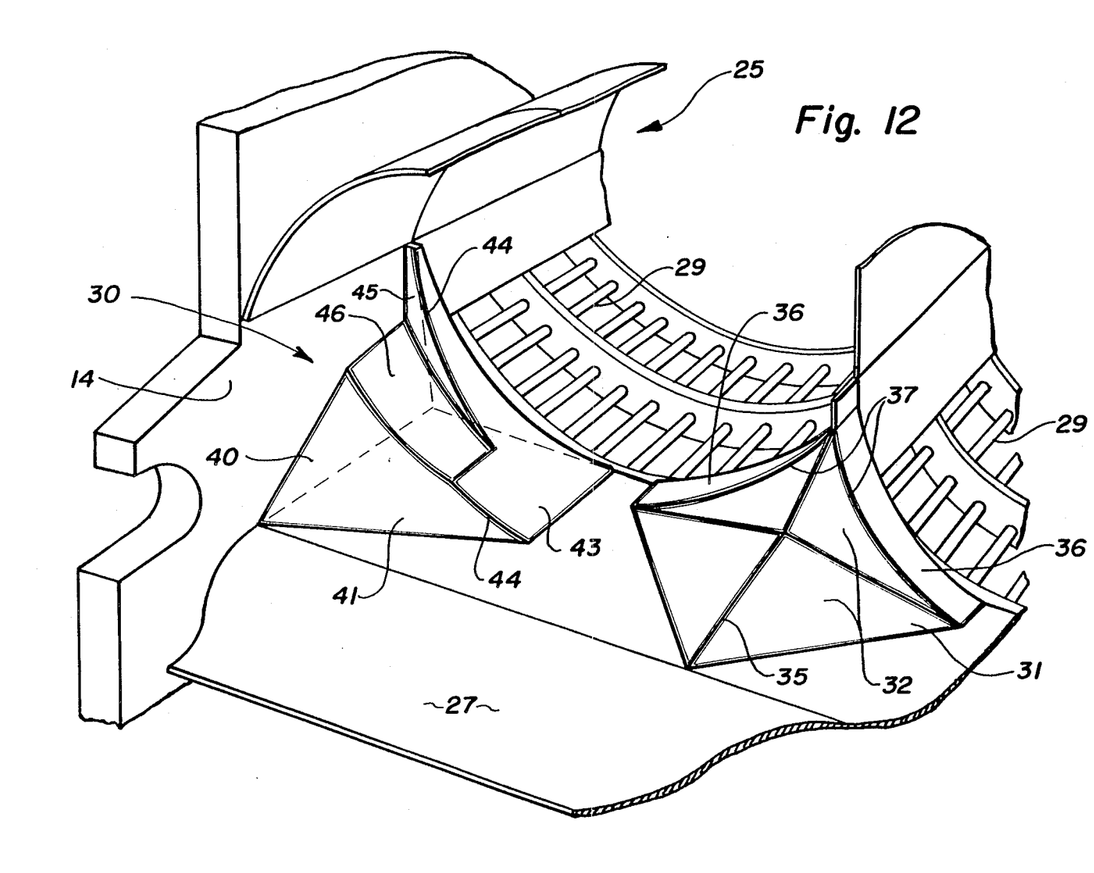
FIG. 12 is an enlarged prospective view of a portion of the infeed area corresponding to the right rotor chamber shown in FIG. 2 depicting an alternative embodiment of the right side member.
Figures 13, 14, 15, 16:
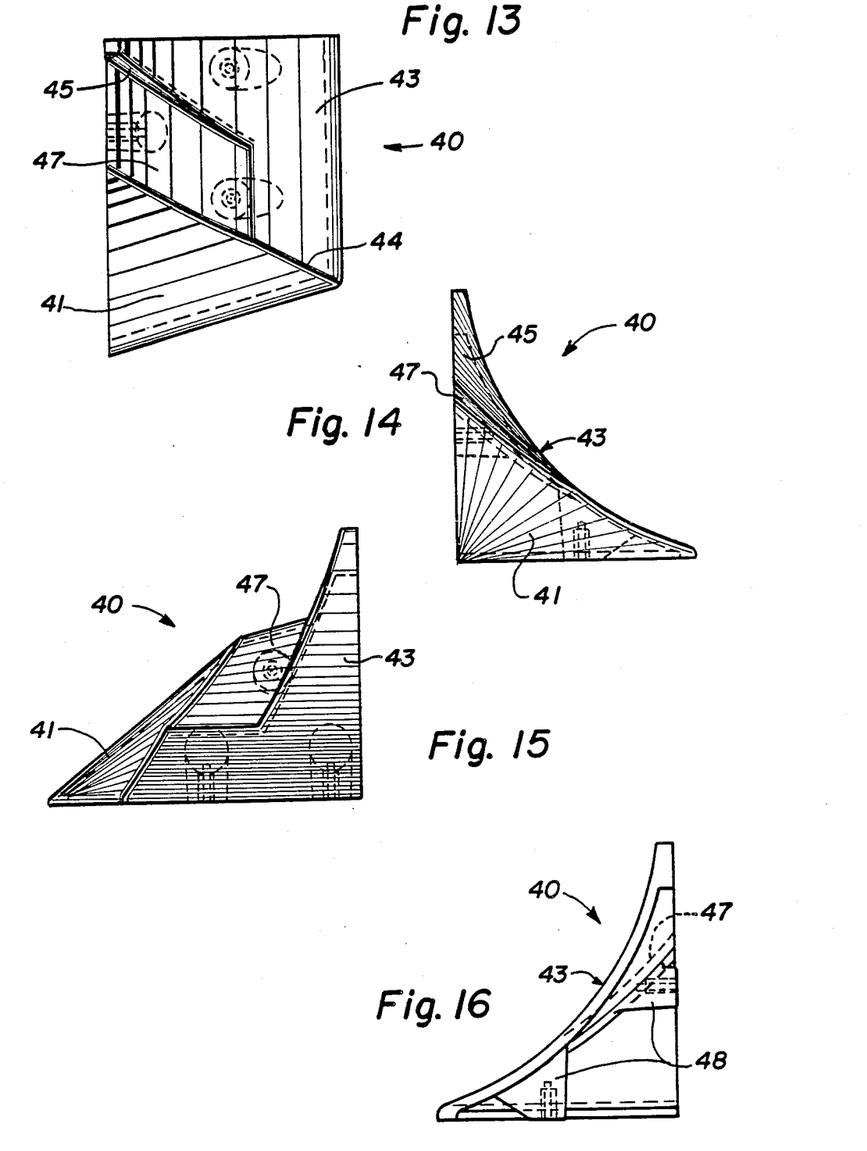
FIG. 13 is a top plan view of the alternative embodiment of the right side member depicted in FIG. 12.
FIG. 14 is a front elevational view of the side member shown in FIG. 13.
FIG. 15 is a side elevational view of the side member shown in FIGS. 13 and 14.
FIG. 16 is a rear elevational view of alternative side member shown in FIGS. 13–15.

Referring now to FIGS. 2 and 12, it can be seen that the junction line 44 on each of the left and right side members 40 extends forwardly of the junction line 37 on the divider member 31 both of which are inclined rearwardly toward the threshing and separating section 24 of the rotor 20 away from the dividing line 35. This resultant infeed configuration permits crop material fed into the infeed area 27 by the elevator 18 to be directed upwardly and rearwardly in cooperation with the auger section 22 of the rotor 20 into two spiral paths extending around the respective rotors 20 away from the dividing line 35 of the dividing member 31. The feed plate structure 31 eliminates any dead spots between the elevator 18 and the rotor chamber 25 in which crop material can accumulate until engaged by the auger flighting 23 and pushed into the rotor chamber 25 as a slug. Accordingly, the flow of crop material around the threshing and separating rotor 20 is continuous and provides uniform transition between the linear path induced by the elevator 18 and the spiral path around the rotor 20 for the threshing and separating thereof.

It will be understood that changes in the details, materials, steps and arrangements of parts which have been described and illustrated to explain the nature of the invention will occur to and may be made by those skilled in the art upon a reading of this disclosure within the principals and scope of the invention. The foregoing description illustrates the preferred embodiment of the invention; however, concepts, as based upon the description, may be employed in other embodiments without departing from the scope of the invention. Accordingly, the following claims are intended to protect the invention broadly, as well as in the specific form shown.

Having thus described the invention, What is claimed is:

1. In a combine harvester having a frame; a pair of longitudinally extending axial flow threshing and separating rotors rotatably supported on said frame each said rotor including a forward auger section and a rearward threshing and separating section; an elevator pivotally mounted on said frame forwardly of said rotors and operable to deliver crop material to said auger sections of said rotors for subsequent conveyance thereof to the respective said threshing and separating sections; and a feed plate supported on said frame between said elevator and said rotors to direct the flow of crop material from said elevator to said auger sections of said rotors, an improved feed plate comprising:

a divider member positioned between said rotors, said divider member having a first surface adjacent said elevator and extending therefrom upwardly and rearwardly toward said rotors and a longitudinally extending dividing line at the transverse center of said divider member to symmetrically divide said first surface such that said first surface slopes inwardly toward the corresponding said rotor from said dividing line, said first surface joining a first arcuate surface concentric with the axis of rotation of each respective said rotor, the junction between said first surface and said first arcuate surface forming a first jointure line extending downwardly and rearwardly relative to the axis of rotation of the rotors, to direct the flow of crop material outwardly away from said dividing line and inwardly toward the corresponding said threshing and separating section to urge said crop material received from said elevator into a spiral path around the circumference of the respective said rotors away from said divider member; and a pair of side members positioned respectively on the opposing sides of the corresponding said rotors from said divider member, each said side member having a second surface adjacent said elevator and extending upwardly and rearwardly therefrom toward the corresponding said rotor, said second surface joining a second arcuate surface concentric with the axis of rotation of the corresponding said rotor, the junction between said second surface and said second arcuate surface forming a second jointure line extending upwardly and rearwardly relative to the axis of rotation of the rotors, to allow said crop material to follow into a spiral path generated by said rotors around the circumference of the respective said rotor, the clearance between each said first and second surfaces and the respective said auger section decreasing from a forward extremity thereof toward said junction with the respective said arcuate surface.

2. The combine harvester of claim 1, wherein said first surface on said divider member has a forward portion and a rearward portion having different vertical slopes.

3. The combine harvester of claim 2 wherein said rearward portion of said first surface has a greater vertical slope than said forward portion.

4. The combine harvester of claim 3 wherein the junction between said forward portion and said rearward portion forms a third jointure line extending downwardly and rearwardly toward the respective said rotors in converging relationship with said first jointure line.

5. The combine harvester of claim 4 wherein said second jointure line is substantially forward of said first jointure line.

6. The combine harvester of claim 1 wherein each said side member includes a transition surface between said second surface and said second arcuate surface, said transition surface having an arcuate configuration with a radius of curvature greater than the corresponding said rotor.

7. The combine harvester of claim 6 wherein said transition surface is contiguous with said second arcuate surface along two sides such that said transition surface provides a clearance relief between said second arcuate surface and the corresponding said auger section.

* * * * *